United States Patent [19]
Nanis

[11] Patent Number: 5,405,646
[45] Date of Patent: Apr. 11, 1995

[54] METHOD OF MANUFACTURE THIN FILM MAGNETIC DISK

[76] Inventor: Leonard Nanis, 627 Georgia Ave., Palo Alto, Calif. 94306

[21] Appl. No.: 142,207

[22] Filed: Oct. 25, 1993

Related U.S. Application Data

[63] Continuation-in-part of Ser. No. 960,968, Oct. 14, 1992, abandoned.

[51] Int. Cl.$^6$ .............................................. H01F 10/02
[52] U.S. Cl. .............................. 427/131; 204/192.15; 204/192.23; 427/132; 427/404; 427/405; 427/406; 428/64
[58] Field of Search ............... 427/131, 132, 405, 404, 427/406; 428/64; 204/192.15, 192.23

[56] References Cited

U.S. PATENT DOCUMENTS

3,466,156  9/1969  Peters et al. ......................... 29/195
4,786,564  11/1988  Chen et al. .......................... 428/694

Primary Examiner—Bernard Pianalto
Attorney, Agent, or Firm—Flehr, Hohbach, Test, Albritton & Herbert

[57] ABSTRACT

The manufacture of thin film magnetic disks in which a non-magnetic layer is deposited on the disk substrate to bind to the substrate and nucleates the electroless plating of a nickel alloy which supports the thin magnetic layer.

16 Claims, 5 Drawing Sheets

METHOD OF MANUFACTURE THIN FILM MAGNETIC DISK

REFERENCE TO PRIOR APPLICATION

This application is a continuation-in-part of application Ser. No. 07/960,968, filed Oct. 14, 1992, abandoned.

BRIEF DESCRIPTION OF THE INVENTION

This invention relates generally to a thin film magnetic disk and method of manufacture.

BACKGROUND OF THE INVENTION

Hard magnetic disks are used to store digital information utilized for data processing. An advantage of such a disk is that it can provide high-speed random access. That is, one can either write or retrieve information from any selected area on the magnetic memory surface without having to serially traverse the full memory space of the disk. Generally, a hard magnetic disk is mounted within a disk drive which is akin to a record turntable in that it includes means for rotation of the disk and means for translating a head across the surface of the disk to provide access to a selected annular track. Typically, a plurality of disks, such as two or four, are mounted on a single spindle in spaced relationship to one another and heads are provided to interact through their magnetic fields with oppositely close planar surfaces of each of such disks.

The disks now available for hard disk memory applications are typically magnetic. Each of the disk surfaces which receives and stores information has a thin layer of magnetic material carried by a substrate. The heads which interact with each of the surfaces are so-called "flying" heads i.e., they do not touch the surface of the disk during its rotation-rather, they ride on an air film which acts as a bearing between the disk and the head. The head typically includes a magnetic coil to permit interacting with the magnetic film through the intervening air film space. The air film prevents wear of the head and the thin magnetic layer on the disk surface which would otherwise be caused by a contact between the head and the surface film.

Figure 1:
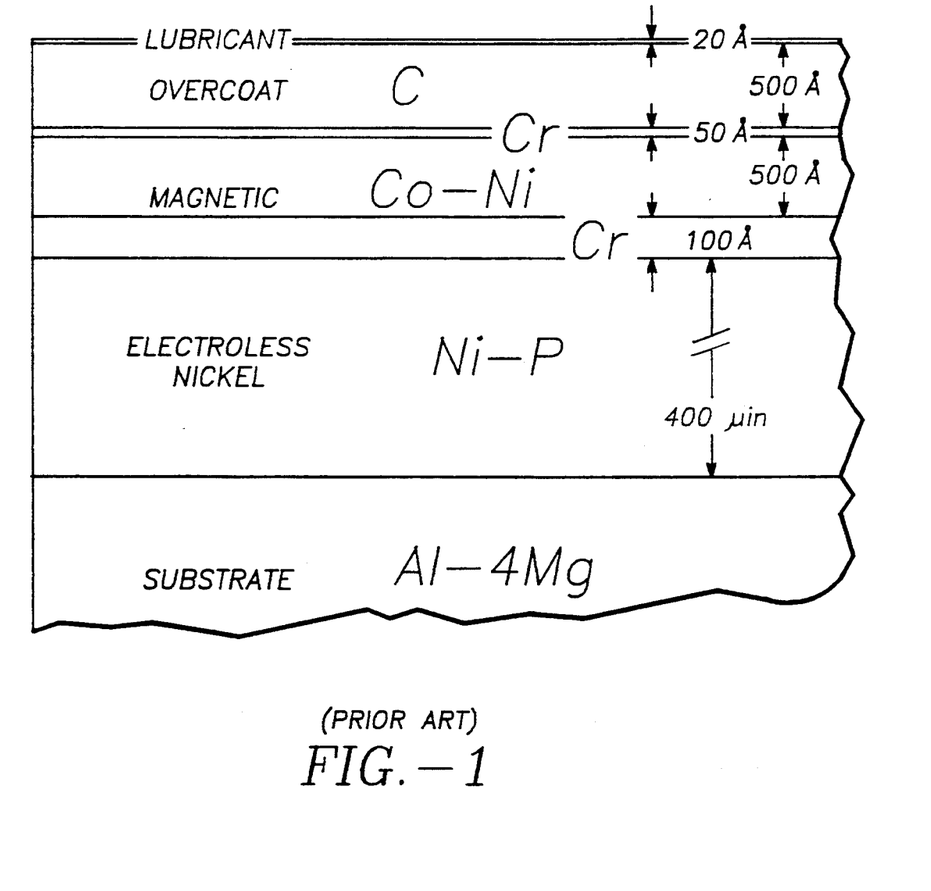
FIG. 1 is an enlarged cross sectional view of a portion of a thin film magnetic disk in accordance with the prior art.

Thin film magnetic media are built up in layers, each of which performs a specific task. As shown in FIG. 1, the basis metal of the disk is generally an aluminum alloy, typically 0.030 inches thick for 2 inch diameter disks and 0.075 inches thick for 5.25 inch diameter disks. Disk alloys generally contain about 4.5 to 5 percent magnesium to add strength to the disk. Because these alloys are soft, a hard surface is built up by adding a coating of nickel-phosphorous (Ni—P) alloy by the immersion process known as electroless nickel plating. The Ni—P layer is typically 300 to 400 microinches in thickness, after polishing to obtain a smooth surface. The hard Ni—P layer is a firm base which provides support to much thinner subsequently added layers. The Ni—P resists mechanical damage which might be caused by inadvertent contact impacts between the head and disk surface.

Figure 2:
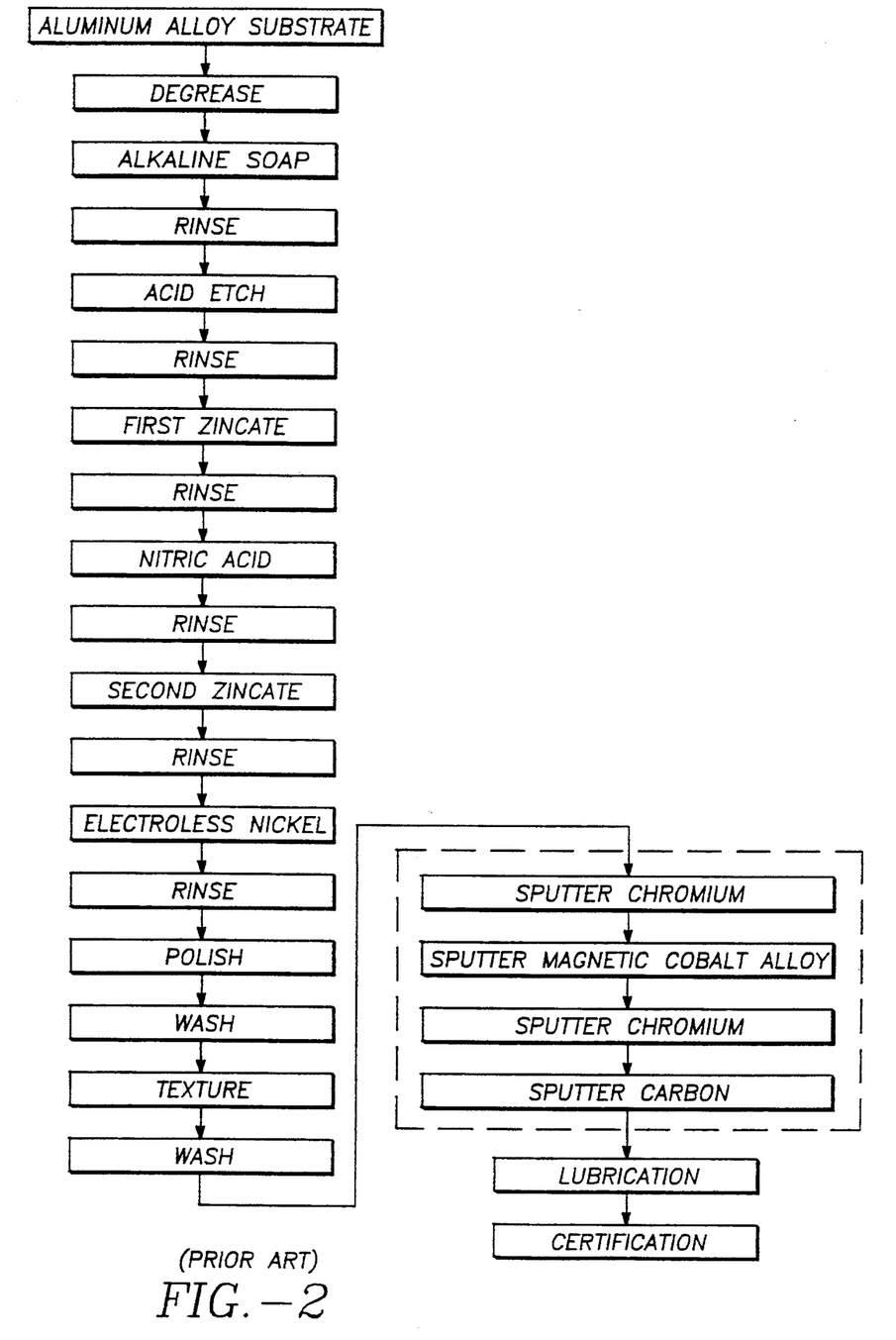
FIG. 2 is a flow chart showing the steps of manufacturing the prior art disk of FIG. 1.

The major steps of coating a disk with the several layers necessary for a thin film memory disk in accordance with the prior art are shown in FIG. 2. The aluminum alloy substrate (disk) is degreased by organic solvents such as Freon, trichlorethylene or isopropyl alcohol. It is then washed in an alkaline soap solution and then rinsed in water. It is then etched in a dilute acid bath generally containing hydrochloric, hydrofluoric and nitric acids and then rinsed. The surface is then prepared for electroless nickel plating of the Ni—P layer by a double zincating process. The double zincate immersion serves a fourfold purpose. Firstly, in the first zincate immersion, the concentrated alkaline solution, such as sodium hydroxide solution, chemically dissolves aluminum oxide from the surface of the aluminum alloy disk. Otherwise, the thin insulating oxide layer found naturally on aluminum would prevent the growth of Ni—P. Secondly, also in the first zincate immersion, zinc electrochemically replaces the aluminum freshly bared by dissolving away the thin oxide layer. A small amount of aluminum metal dissolves and is immediately replaced by a deposit of zinc.

The disk is then rinsed in water and then placed in a nitric acid solution which removes the first zinc deposit, leaving a fully activated surface. The disk is rinsed in water and is then again immersed in an alkaline zincate solution. The surface becomes more completely covered by zinc in the second zincate immersion.

A third function of the zinc layer is as a protective coating. The zinc protects against oxidation of the aluminum alloy disk surface during the following rinsing and during transit to the electroless nickel tank. The disk is rinsed in distilled water and placed in an electroless nickel plating solution to grow a Ni—P protective film.

The fourth action of the zinc coating is the important step of getting the Ni—P plating started. As the zincated surface is immersed in the nickel solution, the zinc provides an automatic battery action to trigger Ni—P deposition. The zinc dissolves into the solution, exposing clean aluminum, and is instantly replaced by a deposit of Ni—P. The deposited Ni—P bonds tightly with the oxide-free aluminum alloy substrate. Once initiated, the growth of Ni—P is self-nucleating as each newly added layer generates further Ni—P deposition.

The zinc coating is strongly affected by the metallurgical microstructure of the aluminum alloy. In the first zincate immersion, zinc is deposited at isolated centers. Although acid dipping and the second zincate immersion produce a more uniform coating, isolated centers of above-average chemical activity remain. These centers are associated with intermetallic compounds formed by impurities in the alloy.

For memory disks, a commonly used aluminum alloy has been 5086, with 4.0 weight percent magnesium as the principal strengthening agent. The microstructure of rolled 5086 alloy sheet contains a large number of inclusions, typically ranging up to one micrometer in size. The inclusions are various intermetallic compounds such as $Al_{12}(FeMn_3)Si$ formed from the combination of aluminum with iron, silicon and other impurity elements. Thus, even though the impurity elements are generally present in amounts typically less than 0.1 percent by weight, they combine with aluminum to form compounds which occupy 1 to 5 percent of the disk surface area and are thus available to participate in the reactions of the wet chemistry.

Newer aluminum alloys such as CZ46, 5186 and 5586 have been developed with fewer and smaller intermetallic inclusions in comparison with the 5086 composition. While this approach has been successful, the task of double zincating remains that of compensating for the localized variations in disk surface chemistry due to the presence of the intermetallic particles. Hydrogen gas evolution can occur preferentially on intermetallic particles. Pits in the Ni—P deposit can result when adhering gas bubbles block off Ni—P plating. Intermetallic particles also serve as preferential sites of Ni—P deposition. As a result, localized growth from such a site can be ahead of the general linear advance of Ni—P growth. The advanced localized growth nucleates additional radial growth, ultimately becoming a large hemispherical nodule on the final deposit surface. Thus, the imperfections in the initial layer can cause growth (nodules) or absence of growth (pits) which thereafter propagate through the following deposits.

The Ni—P layer is plated extra thick by the electroless method and the rough nodular surface is then partially polished away so that a completely dense and smooth surface remains. The smooth surface is then lightly textured to aid flying of the head. The disks are then loaded into a vacuum sputtering system indicated by the dotted box, FIG. 2. As the disk surface passes by several stations within the vacuum chamber, layers are built up by material selectively deposited by vacuum sputtering from targets on each side of the in-line vacuum sputtering system. The first in-line station preheats the disk surfaces, followed by a station for reverse sputter etching to remove any accumulated thin oxide layer from the Ni—P. Layers of chromium, cobalt alloy and carbon are then sputter deposited from a sequence of sputter targets, all within the same vacuum chamber.

The first vacuum sputtered layer to be deposited is chromium, typically from about 0.4 to 4 millionths of an inch thick (0.4 to 4 microinches), as shown in FIG. 1. The chromium (Cr) beneficially orients the crystal growth of the next vacuum sputter deposited layer, an alloy in which cobalt (Co) is the major constituent. The magnetic cobalt alloy is the key layer for information storage and is typically vacuum sputter deposited to a thickness of about 2 microinches (500 Å).

A carbon overcoat layer is then vacuum sputter deposited on top of the magnetic layer, with a thin (0.2 microinch) intermediate layer of sputtered chromium being first added to bind the carbon to the magnetic layer. The carbon overcoat is generally vacuum sputter deposited to a thickness of about 1 to 2 microinches, as shown in FIG. 1. The vacuum sputter deposited carbon layer is a low friction surface upon which the head can slide, when required. The lubrication property of the vacuum sputter deposited carbon layer is usually enhanced by the later addition of a thin fluorocarbon coating outside of the vacuum sputtering chamber. As a final step before packaging and shipment, each disk is certified by carefully measuring its response to standard read-write signal patterns.

Although the Ni—P layer performs its mechanical task well, several wet chemical surface preparation steps are needed to assure good adhesion of the Ni—P on the aluminum substrate. The many steps of the double zincate treatment present undesirable opportunities for mishaps and correspondingly low yields.

OBJECTS AND SUMMARY OF THE INVENTION

It is an object of this invention to provide an improved thin film magnetic disk and method of manufacture.

It is another object of the invention to provide a lower cost method of manufacturing a thin film magnetic disk which results from use of lower cost materials, simplified process controls, increased throughput and higher yield.

It is another object of the invention to provide a process in which the wet chemistry surface preparation steps are replaced by a vacuum sputter deposition process.

These axed other objects of the invention are achieved by depositing one or more thin layers by vacuum methods such as vacuum sputter deposition, vacuum evaporation from a source, etc. onto the surface of a disk substrate such as aluminum, glass, ceramic or other suitable strong materials, said vacuum deposited layers to serve the purpose of binding to the substrate and providing a new surface which nucleates the electroless plating of nickel-phosphorous or other Ni alloys. The addition of the thin layer of a few hundred Angstrom thickness by vacuum sputter deposition or other dry deposition techniques renders the otherwise inert substrate into one which readily initiates electroless nickel deposition.

More particularly there is provided a magnetic disk which comprises a substrate with a vacuum deposited metallic layer, formed directly on the substrate by deposition of metal in vacuum, which nucleates the electroless plating of a nickel alloy which carries a thin magnetic layer. The invention is also directed to the method of forming the magnetic disk.

BRIEF DESCRIPTION OF THE DRAWINGS

The invention will be more clearly understood from the following description when read in connection with the drawings of which.

DESCRIPTION OF THE PREFERRED EMBODIMENT

Figure 3:
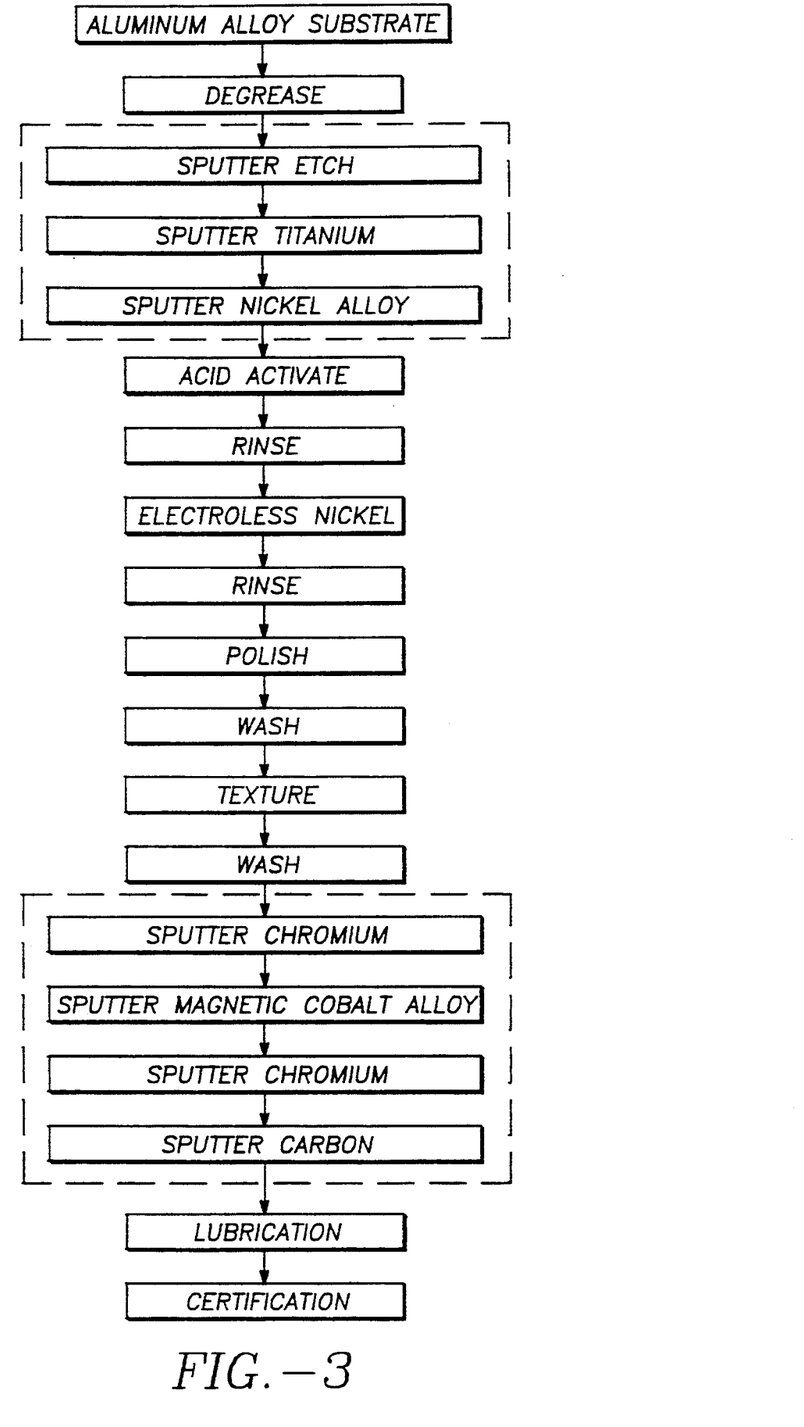
FIG. 3 is a flow chart showing the steps of manufacturing a disk in accordance with the invention.
Figure 4:
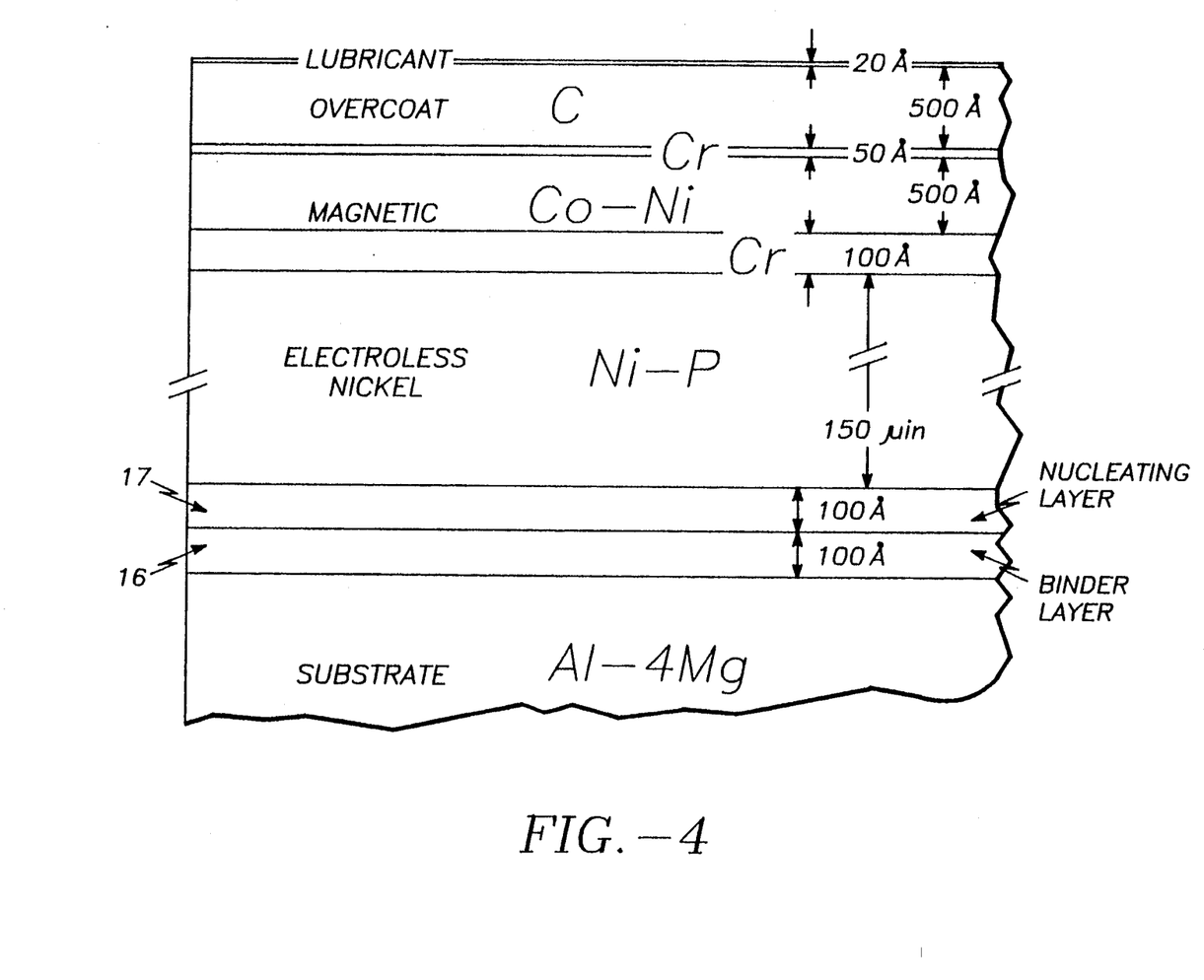
FIG. 4 is an enlarged cross sectional view of a portion of a disk manufactured in accordance with one embodiment of the invention; and, FIG. 5 is an enlarged cross sectional view of a portion of a disk manufactured in accordance with another embodiment of the invention.
Figure 5:
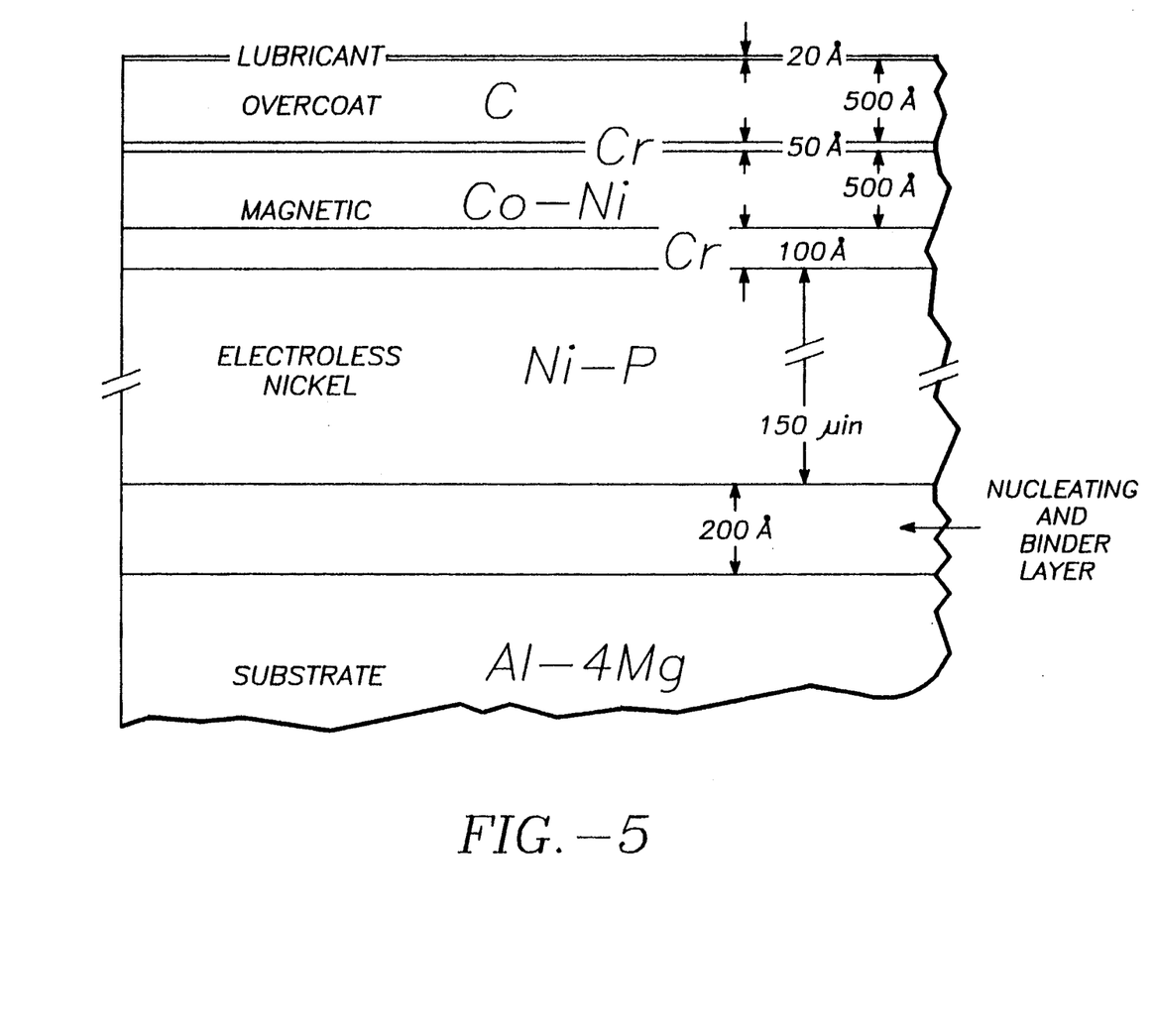

In accordance with the present invention, FIG. 3, the aluminum alloy substrate (disk) is first degreased by organic solvents, as in the prior art. The substrate is then moved into a vacuum sputtering system designated by the dotted block. Vacuum sputter deposition systems are well known. Suffice to say that in such systems the substrate is placed in an evacuated enclosure for processing. The first step is to further clean the surface by reverse sputter etching. In accordance with an embodiment of the invention, a first layer 16, FIG. 4, of material selected to bind with the aluminum surface is vacuum sputter deposited onto the surface. This is followed by vacuum sputter depositing a second layer 17 which serves as the nucleating layer for the subsequent electroless plating of a Ni—P layer.

Pure chromium and pure titanium are preferred for the binder layer materials. Zirconium, vanadium, niobium, molybdenum, tantalum, tungsten and rhenium as well as alloy combinations of these elements may also be vacuum sputter deposited onto the aluminum disk as a first layer. The first (binder) layer covers the aluminum alloy and imbedded inclusions equally. This prevents the different behavior of these regions as occurs in the prior art process which relies on wet chemical processing only.

The second vacuum sputter deposited thin layer is selected to: 1. bond tightly to the first layer; 2. further cover over inclusions; 3. resist oxidation during storage; 4. be insoluble in the electroless nickel solution; 5. nucleate the growth of electroless nickel; 6. bond tightly with electroless nickel; and 7. be nonmagnetic or selected that it does not interfere with the magnetic field produced by the read-write head.

The most important requirements are the ability to nucleate Ni—P plating upon immersion in the electroless nickel bath and to provide non-magnetic behavior. Pure nickel is an effective nucleating layer and, if the aluminum alloy surface is smooth, the growth of Ni—P will continue as a smooth surface. Although pure nickel is magnetic, calculation shows that the layer will be sufficiently remote from the field of the read-write head so as to be of negligible influence if the Ni—P layer thickness is 150 microinches or greater. Pure cobalt, pure iron and mixtures of Co, Fe and Ni will also be effective nucleating materials.

Although field calculations show that magnetic nickel may be used as the second layer, other non-magnetic materials may be deposited to nucleate Ni—P and satisfy all other requirements. Alloys of nickel mixed with amounts of alloy element sufficient to depress the Curie temperature to room temperature or below are suitable. In one embodiment, the second layer can be comprised of copper-nickel alloys of compositions having greater than 30 weight percent copper, which have a Curie temperature below 25 degrees Centigrade. To additionally insure non-magnetic behavior of the second layer, a preferred embodiment is sputtered copper-nickel alloys of composition having greater than 33.5 weight percent Cu, which have Curie temperatures of 0 degrees Centigrade and below.

Pure copper is non-magnetic and nucleates Ni—P growth from electroless nickel baths containing chloride ion and it also nucleates nickel-boron alloy from electroless nickel baths containing amino borane. Copper is thus an alternate second layer material. Pure palladium and pure platinum are also non-magnetic and can nucleate Ni—P deposition, and are suitable second layer materials. Alloy mixtures of nickel and copper are resistant to oxidation, as are also pure palladium and platinum, permitting storage without degradation of the surface after sputter deposition but before immersion in the electroless nickel tank. Alloys of copper with palladium and of copper with platinum are also suitable for the second layer. The Cu—Pd and Cu—Pt alloys may range within wide composition limits. Ternary mixtures of Cu, Pt and Pd in all proportions are also suitable second layer materials. In addition to palladium and platinum, second layer materials are pure gold, pure rhodium, pure osmium, pure ruthenium and pure rhenium. Alloys of said non-magnetic and Ni—P nucleating pure elements are also useful in binary combinations or multi-element mixtures over a substantially broad range of compositions.

Other non-magnetic alloys of nickel are suitable for the second seed layer. Curie magnetic transitions below the 0 to 25 degrees Centigrade range of room temperatures occur in several nickel-containing alloys such as: nickel with more than 60 weight percent platinum; nickel with more than 87 weight percent palladium; nickel with more than 10 percent molybdenum; nickel with more than 5.5 weight percent vanadium; nickel with more than 4.5 weight percent silicon; nickel with more than 8 weight percent titanium; nickel with more than 7 weight percent chromium; nickel with more than 6 weight percent aluminum; nickel with more than 16.5 weight percent antimony; nickel with more than 24 weight percent manganese; and nickel with more than 21 weight percent zinc.

In another embodiment, only one vacuum sputter deposited thin layer fulfills the task of the first and second layers. A dual purpose single layer is comprised of a mixture of nickel and titanium. The mixture can have a wide range of compositions from at least 8 weight percent titanium and more. A nickel and titanium layer will adhere to the aluminum and will also nucleate Ni—P deposition. Another dual purpose single layer is comprised of alloys of nickel with chromium of compositions within a substantially wide range of concentration greater than at least 7 weight percent chromium.

By way of example, the layer can be comprised of nickel alloy having a Curie magnetic transition substantially below room temperature as provided by mixtures of nickel with more than 33.5 by weight percent copper, or 60 by weight percent platinum, or 87 by weight percent palladium, or 10 by weight percent molybdenum, or 5.5 by weight percent vanadium, or 4.5 by weight percent silicon, or 8 by weight percent titanium, or 7 by weight percent chromium, or 6 by weight percent aluminum, or 16.5 by weight percent antimony, or 24 by weight percent manganese, or 21 by weight percent zinc. Any oxide formed on second layers or dual purpose single layers will be removed by the acid activation just prior to electroless nickel plating. The nature and strength of the acid and temperature and immersion time are selected to be most effective with each second layer or single layer dual purpose alloy. Vacuum sputter deposition affords great flexibility for adjustment of deposit composition, either with pre-mixed alloy targets or mechanically combined targets, so that all disclosed first layer, second layer and dual purpose layer compositions can be vacuum sputter deposited. It is to be understood that although the invention is directed in connection with vacuum sputtering that the thin nucleating and binder layers may be deposited by other techniques such as chemical vapor deposition and physical chemical vapor deposition, evaporation and the like.

The remaining steps of the process are shown in FIG. 3 and are identical to the steps followed in the prior art, FIG. 2. Wet chemical addition of Ni—P deposit is followed by polishing and the vacuum sputter deposition at chromium, magnetic cobalt alloy and carbon.

As discussed and described above, the first and second layers cover the chemical non-uniformities and block their tendency to produce localized growth in advance of the main Ni—P deposit. In this way, the chemistry of the aluminum alloy has no effect on subsequent Ni—P deposition. Since the process covers over the chemical and metallurgical differences in the aluminum alloy, it may be possible to use less expensive alloy grades for which special treatments to remove intermetallic forming elements are not necessary. Also, glass, ceramic and polymeric substrates can be coated with Ni—P by this method. For example, the first layer may be chromium and titanium of which each bonds well to both glass, ceramic and plastic polymer materials. Other materials, such as lightweight titanium or magnesium alloys, can also be used as the substrate (disk).

A vacuum sputter deposition system dedicated to the improved process will feed disks to the electroless nickel plating step. In one embodiment, the vacuum sputter deposition system includes a sputter etch station to clean the aluminum or ceramic or glass substrate, a titanium (or chromium) target to provide a vacuum sputter deposited binder layer and a seed layer target to provide the surface with a thin layer capable of nucleating Ni—P electroless deposition. The titanium binder layer and seed layers can be thin, on the order of 100 to 200 Angstroms (0.4 to 0.8 microinch).

Upon immersion in the electroless nickel bath, the top (second) or seed layer remains in place. The atomic structure of the second (seed) layer nucleates the growth of electroless nickel uniformly over the entire surface. Once nucleated, the Ni—P deposit continues to grow uniformly, with a smooth surface even after growth to a thickness of 500 microinches. Since the layers follow the surface of the aluminum, the Ni—P surface will be smooth if the aluminum is also smooth. The smooth, as-deposited surface requires little or no polishing so that less Ni—P thickness is needed. As experience is gained with the present process, it may be possible to completely bypass polishing. For the present, some polishing is retained in the process in order to provide extra assurance of a smooth finish and also to produce a metallurgical surface condition comparable to present practice.

Thinner Ni—P deposits will be acceptable because the as-plated surface will be smooth, needing minimal polishing. For a reduced thickness of Ni—P deposit, plating time is less and more disk loads can be started per shift. Deposit thickness may be limited to 300 microinches instead of the more typical 450 microinches which then requires the removal of 150 microinches by polishing. The corresponding increase of plating throughput is 50 percent. If the plating is limited to 150 microinches, a 200 percent increase of throughput can be achieved.

The present process offers ecological advantages. Waste water treatment is reduced by about one third because three rinse stations are eliminated in the electroless nickel plating line and also because the requirement for polishing slurry is greatly reduced. No zinc ions will be discharged in the waste water effluent because zincate solutions are totally eliminated from the surface preparation sequence.

Thus there has been described an improved method of manufacturing thin film magnetic disks and improved magnetic disks. In addition to providing improved magnetic disks, the process lowers manufacturing costs both in material and processing, and provides better throughput and yield. In summary, the sequence vacuum sputter deposition of a thin seed layer followed by improved wet process electroless nickel and polishing followed by vacuum sputter deposition of the magnetic layer as in the prior art provides an improved process and improved magnetic disks. This novel vacuum-wet-vacuum sequence replaces the less desirable wet-vacuum sequence of the prior art on which the substrate material receives a wet process electroless nickel deposit followed by vacuum sputter deposition of the magnetic layer. A further advantage of the novel vacuum-wet-vacuum process permits the use of glass, metal, ceramic or polymer plastic substrates which do not nucleate electroless nickel deposition.

What is claimed:

1. The method of manufacture of thin film magnetic disks of the type which include a substrate which carries a thin magnetic film deposited on the surface of an electroless plated nickel alloy layer, the improvement comprising the step of vacuum-sputter deposition of a thin metallic layer onto the surface of the substrate, said thin metallic layer selected to bind to the substrate and to nucleate the electroless plating of said nickel alloy in a subsequent wet chemistry step.

2. The method of manufacture of thin film magnetic disks as in claim 1 in which the substrate is an aluminum alloy and the nickel alloy layer is a nickel-phosphorous alloy.

3. The method of manufacture of thin film magnetic disks as in claim 1 in which the nucleating metallic layer is a nickel, cobalt or iron alloy having a Curie magnetic transition below room temperature.

4. The method of manufacture of thin film magnetic disks as in claim 3 in which the nickel alloy layer is selected from the group consisting of nickel and more than 33.5 by weight percent copper, or 60 by weight percent platinum, or 87 by weight percent palladium, or 10 by weight percent molybdenum, or 5.5 by weight percent vanadium, or 4.5 by weight percent silicon, or 8 by weight percent titanium, or 7 by weight percent chromium, or 6 by weight percent aluminum, or 16.5 by weight percent antimony, or 24 by weight percent manganese, or 21 by weight percent zinc.

5. The method of manufacture of thin film magnetic disks as in claim 1 in which the thin nucleating metallic layer is comprised of substantially pure nickel, or substantially pure cobalt or pure iron, which, although it is magnetic, will be sufficiently thin and remote from the main strength of the write-read head of a disk drive so as to contribute a negligible effect to the magnetic interaction of the head and disk.

6. The method of manufacture of thin film magnetic disks as in claim 1 in which the thin nucleating metallic layer comprises non-magnetic, substantially pure elements selected from the group comprising pure gold, pure copper, pure palladium, pure rhodium, pure osmium, pure ruthenium or pure platinum.

7. The method of manufacture of thin film magnetic disks as in claim 1 in which the thin nucleating metallic layer is comprised of copper alloy mixtures with substantially wide composition limits of copper with a metal selected from the group comprising gold, nickel, palladium, platinum, nickel and palladium, nickel and platinum, palladium and platinum, zinc, tin, or zinc and tin.

8. The method of manufacture of thin film magnetic disks as in claim 1 in which said nucleating metallic layer comprises a first thin non-magnetic binder layer which bonds to the substrate and a top second non-magnetic layer which bonds to the first layer and which nucleates the electroless plating of the nickel alloy.

9. The method of manufacture of thin film magnetic disks as in claim 8 in which the thin binder layer is selected from the group comprising chromium, titanium or alloy mixtures of chromium and titanium.

10. The method of manufacture of thin film magnetic disks as in claim 8 in which said binder layer is selected from the group comprising zirconium, niobium, rhenium, vanadium, molybdenum, chromium, titanium, silicon or alloy combinations of these elements.

11. The method of manufacture of thin film magnetic disks as in claims 1 or 8, wherein said substrate is an aluminum alloy.

12. The method of manufacture of thin film magnetic disks as in claims 1 or 8, wherein said substrate is ceramic or glass.

13. The method of manufacture of thin film magnetic disks as in claims 1 or 8 in which the substrate is a light weight high strength metal selected from the group of magnesium and its alloys or titanium and its alloys.

14. The method of manufacture of thin film magnetic disks as in claims 1 or 8 in which the substrate is an organic, inorganic, or polymeric material.

15. The method of manufacture of thin film magnetic disks as in claims 1 or 8 wherein said substrate is comprised of carbon or graphitic substances or composite materials containing said substances.

16. The method of manufacture of thin film magnetic disks of the type which include a substrate which carries a thin magnetic film deposited on the surface of an electroless plated nickel alloy layer, the improvement comprising the step of depositing in vacuum a thin metallic layer directly onto the surface of the substrate, said thin metallic layer selected to bind to the substrate and to nucleate the electroless plating of the nickel alloy in a subsequent wet chemistry step.

* * * * *

UNITED STATES PATENT AND TRADEMARK OFFICE
CERTIFICATE OF CORRECTION

PATENT NO. : 5,405,646

DATED : April 11, 1995

INVENTOR(S) : Leonard Nanis

It is certified that error appears in the above-indentified patent and that said Letters Patent is hereby corrected as shown below:

At column 4, line 5, change "axed" to --and--.

Signed and Sealed this

Third Day of October, 1995

BRUCE LEHMAN

*Attest:*

*Attesting Officer*          *Commissioner of Patents and Trademarks*